(12) United States Patent
Michaels

(10) Patent No.: US 10,778,279 B2
(45) Date of Patent: Sep. 15, 2020

(54) HIGH-ORDER PSK SIGNALING (HOPS) TECHNIQUES FOR LOW-POWER SPREAD SPECTRUM COMMUNICATIONS

(71) Applicant: TOKAY SYSTEMS LLC, Blacksburg, VA (US)

(72) Inventor: Alan Michaels, Blackburg, VA (US)

(73) Assignee: TOKAY SYSTEMS LLC, Blacksburg, VA (US)

( * ) Notice: Subject to any disclaimer, the term of this patent is extended or adjusted under 35 U.S.C. 154(b) by 0 days.

(21) Appl. No.: 16/119,772

(22) Filed: Aug. 31, 2018

(65) Prior Publication Data

US 2019/0068241 A1 Feb. 28, 2019

Related U.S. Application Data

(60) Provisional application No. 62/553,039, filed on Aug. 31, 2017, provisional application No. 62/553,035, filed on Aug. 31, 2017.

(51) Int. Cl.
*H04B 1/709* (2011.01)
*H04L 27/227* (2006.01)
*H04L 5/00* (2006.01)

(52) U.S. Cl.
CPC .......... *H04B 1/709* (2013.01); *H04L 27/227* (2013.01); *H04L 27/2278* (2013.01);
(Continued)

(58) Field of Classification Search
CPC ...... H04B 1/69; H04B 1/707; H04B 1/70712; H04B 1/709; H04B 1/7093; H04B 1/7097;
(Continued)

(56) References Cited

U.S. PATENT DOCUMENTS 5,237,587 A * 8/1993 Schoolcraft ............ H04B 1/707
375/150
5,918,161 A * 6/1999 Kumar .................... G01S 19/22
342/357.61
(Continued)

OTHER PUBLICATIONS

B. G. Agee, R. J. Kleinman and J. H. Reed, "Soft synchronization of direct sequence spread-spectrum signals," in IEEE Transactions on Communications, vol. 44, No. 11, pp. 1527-1536, Nov. 1996.
(Continued)

*Primary Examiner* — Young T Tse
(74) *Attorney, Agent, or Firm* — Trellis IP Law Group, PC

(57) ABSTRACT

A signal receiver for receiving a HOPS-based communications signal includes a seed calculator configured to produce a series of seed vectors generated from a corresponding series of sets of key values. A sequence generator provides a series of internally generated sequences using the series of seed vectors. A fallthrough correlator produces a series of correlation values by correlating samples of a received signal and samples of the internally generated sequences. The spreading sequences are used by a transmitter to generate a transmit signal subsequently received as the received signal. A peak detector is configured to generate a trigger signal upon determining that at least one of the correlation values exceeds a threshold value. At least one of a plurality of demodulator chains is selected in response to the trigger signal and used to demodulate the received signal in order to recover data values carried by the received signal.

17 Claims, 9 Drawing Sheets

(52) U.S. Cl.
CPC .. *H04B 2201/70706* (2013.01); *H04L 5/0016* (2013.01); *H04L 2203/00* (2013.01)

(58) Field of Classification Search
CPC .......... H04B 2201/70706; H04L 27/22; H04L 27/227; H04L 27/2273; H04L 27/2278; H04L 2203/00
USPC ....... 375/140, 142, 143, 147, 150, 152, 343, 375/350; 370/335, 337, 342, 344
See application file for complete search history.

(56) References Cited

U.S. PATENT DOCUMENTS

| | | | | |
|---|---|---|---|---|
| 6,037,835 | A * | 3/2000 | Smith | H04B 1/406 329/316 |
| 7,433,910 | B2 | 10/2008 | Rawlins et al. | |
| 8,064,552 | B2 | 11/2011 | Chester et al. | |
| 8,644,362 | B1 | 2/2014 | Lauer et al. | |
| 2003/0137765 | A1* | 7/2003 | Yamazaki | G11B 5/09 360/39 |
| 2006/0072653 | A1* | 4/2006 | Hafuka | H04B 1/7075 375/148 |
| 2008/0079634 | A1* | 4/2008 | Nakamura | G01S 3/46 342/368 |
| 2011/0038444 | A1* | 2/2011 | Goto | H04L 1/201 375/343 |
| 2014/0292548 | A1* | 10/2014 | Ling | H03M 7/40 341/67 |

OTHER PUBLICATIONS

R. Cameron and B. Woerner, "Performance analysis of CDMA with imperfect power control," in IEEE Transactions on Communications, vol. 44, No. 7, pp. 777-781, Jul. 1996.

R. Chakravarthy et al. "Primary User authentication of cognitive radio network using underlay waveform," 2017 Cognitive Communications for Aerospace Applications Workshop (CCAA), Cognitive Communications for Aerospace Applications Workshop (CCAA), 2017.

J. H. Cho and J. S. Lehnert, "Performance of a spatio-temporal matched filter receiver for DS/SSMA communications," in IEEE Journal on Selected Areas in Communications, vol. 18, No. 8, pp. 1505-1515, Aug. 2000.

G. E. Corazza and A. Vanelli-Coralli, "Burst vs. continuous pilot acquisition in wideband CDMA cellular mobile systems," WCNC. 1999 IEEE Wireless Communications and Networking Conference (Cat. No. 99TH8466), New Orleans, LA, 1999, pp. 1080-1084 vol. 3.

C. Du, H. Zeng, W. Lou and Y. T. Hou, "On cyclostationary analysis of WiFi signals for direction estimation," 2015 IEEE International Conference on Communications (ICC), London, 2015, pp. 3557-3561.

M. Fine and F. A. Tobagi, "Demand Assignment Multiple Access Schemes in Broadcast Bus Local Area Networks," in IEEE Transactions on Computers, vol. C-33, No. 12, pp. 1130-1159, Dec. 1984.

J. H. Fischer, J. H. Cafarella, C. A. Bouman, G. T. Flynn, V. S. Dolat and R. Boisvert, "Wide-band packet radio for multipath environments," in IEEE Transactions on Communications, vol. 36, No. 5, pp. 564-576, May 1988.

F. Harris, C. Dick, and M. Rice, "Digital receivers and transmitters using polyphase filter banks for wireless communications," IEEE Trans. on Microwave Theory and Techn., vol. 51, pp. 1395-1412, Apr. 2003.

G. Heidari-Bateni and C. D. McGillem, "A chaotic direct-sequence spread-spectrum communication system," in IEEE Transactions on Communications, vol. 42, No. 234, pp. 1524-1527, Feb./Mar./Apr. 1994.

R. M. Hewlitt and E. S. Swartzlantler, "Canonical signed digit representation for FIR digital filters," 2000 IEEE Workshop on Signal Processing Systems. SiPS 2000. Design and Implementation (Cat. No. 00TH8528), Lafayette, LA, 2000, pp. 416-426.

G. Kaddoum and F. Gagnon, "Design of a High-Data-Rate Differential Chaos-Shift Keying System," in IEEE Transactions on Circuits arid Systems II: Express Briefs, vol. 59, No. 7, pp. 448-452, Jul. 2012.

T. K. Ksheerasagar, S, Anuradha, G. Avadhootha, K. S. R. Charan and Sri Hari Rao P, "Performance analysis of DS-CDMA using different chaotic sequences," 2016 International Conference on Wireless Communications, Signal Processing and Networking (WiSPNET), Chennai, 2016, pp. 2421-2425.

Jing Lei and Tung-Sang Ng, "Pilot-tone-based maximum likelihood estimator for carrier frequency offset in OFDM systems," Communications, 2003. ICC '03. IEEE International Conference on, 2003, pp. 2046-2050 vol. 3.

S. J. Lee and J. Ahn, "Acquisition performance improvement by Barker sequence repetition in a preamble for DS-CDMA systems with symbol length spreading codes," in IEEE Transactions on Vehicular Technology, vol. 52, No. 1, pp. 127-131, Jan. 2003.

J. Iinatti, "Matched filter code acquisition of burst and continuous pilot signal in Doppler shift," 11th IEEE International Symposium on Personal Indoor and Mobile Radio Communications. PIMRC 2000. Proceedings (Cat. No. 00TH8525), London, 2000, pp. 1276-1280 vol. 2.

J. Lindenlaub and K. Chen, "Performance of Matched Filter Receivers in Non-Gaussian Noise Environments," in IEEE Transactions on Communication Technology, vol. 13, No. 4, pp. 545-547, Dec. 1965.

J. Low and S. M. Waldstein, "A Direct Sequence Spread-Spectrum Modem for Wideband HF Channels," MILCOM 1982—IEEE Military Communications Conference—Progress in Spread Spectrum Communications, 1982, pp. 29.6-1-29.6-6.

A. Martin, Y. Hasan and R. M. Buehrer, "Physical layer security of hybrid spread spectrum systems," 2013 IEEE Radio and Wireless Symposium, Austin, TX, 2013, pp. 370-372.

A.J. Michaels and D. B. Chester, "Efficient and flexible chaotic communication waveform family," 2010—MILCOM 2010 Military Communications Conference, San Jose, CA, 2010, pp. 1250-1255.

A. J. Michaels and D. B. Chester, "Adaptive correlation techniques for spread spectrum communication systems," MILCOM 2016—2016 IEEE Military Communications Conference, Baltimore, MD, 2016, pp. 678-681.

A. J. Michaels and C. Lau, "Generalized Multi-carrier Chaotic Shift Keying," 2014 IEEE Military Communications Conference, Baltimore, MD, 2014, pp. 657-662.

A.J. Michaels, "High-Order PSK Signaling (HOPS) Techniques for Low-Power Spread Spectrum Communications," Military Communications Conference (MILCOM) 2017, pp. [submitted].

A. Michaels, "Digital Chaotic Communications," PhD Dissertation, Georgia Institute of Technology, 2009.

A. Michaels, "A maximal entropy digital chaotic circuit," in Circuits and Systems (ISCAS), 2011 IEEE International Symposium on, vol., No., pp. 717-720, May 15-18, 2011.

A. Michaels, "Improved RNS-based PRNGs" in IEEE Military Communications Conference (MILCOM), [submitted], 2017.

A. J. Michaels and C. C. Lau, "Quantization Effects in Digital Chaotic Communication Systems," MILCOM 2013—2013 IEEE Military Communications Conference, San Diego, CA, 2013, pp. 1564-1569.

A. Mpitziopoulos, D. Gavalas, C. Konstantopoulos and G. Pantziou, "A survey on jamming attacks and countermeasures in WSNs," in IEEE Communications Surveys & Tutorials, vol. 11, No. 4, pp. 42-56, Fourth Quarter 2009.

E. E. Petrovsky (2018). "Network scalability comparison of IEEE 802.15.4 and receiver-assigned CDMA," IEEE, 9 total pages.

M. B. Pursley, T. C. Royster and M. Y. Tan, "High-rate direct-sequence spread spectrum," IEEE Military Communications Conference, 2003. MILCOM 2003, pp. 1101-1106 vol. 2.

N. X. Quyen, C. T. Nguyen, P. Barlet-Ros and R. Dojen, "A novel approach to security enhancement of chaotic DSSS systems," 2016 IEEE Sixth International Conference on Communications and Electronics (ICCE), Ha Long, 2016, pp. 471-476.

(56) References Cited

OTHER PUBLICATIONS

S. A. Rabee, B. S. Sharif and S. Sali, "An efficient algorithm for distributed power control in cellular radio systems," Third International Conference on 3G Mobile Communication Technologies, 2002, pp. 123-127.

M. Spellman, "A Comparison between Frequency Hopping and Direct Spread PN as Antijam Techniques," MILCOM 1982—IEEE Military Communications Conference—Progress in Spread Spectrum Communications, 1982, pp. 14.4-1-14.4-6.

M. K. Sust and A. Goiser, "A combinatorial model for the analysis of digital matched filter receivers for direct sequence signals," Global Telecommunications Conference and Exhibition 'Communications Technology for the 1990s and Beyond' (GLOBECOM), 1989. IEEE, Dallas, TX, 1989, pp. 1634-1640 vol. 3.

H. H. Takada and A. Anzaloni, "On Bandwidth Allocation for Demand-Assignment Multiple Access Systems," 2006 International Conference on Communication Technology, Guilin, 2006, pp. 1-4.

F. Tufvesson, S. Gezici and A. F. Molisch, "Ultra-Wideband Communications using Hybrid Matched Filter Correlation Receivers," in IEEE Transactions on Wireless Communications, vol. 5, No. 11, pp. 3119-3129, Nov. 2006.

D. Yan and P. Ho, "Code acquisition in a CDMA system based on Barker sequence arid differential detection," in IEEE PIMRC'95, Toronto, ON, Canada, 1995, pp. 233-236.

Young-Hyun Oh and D. J. Thuente, "Enhanced security of random seed DSSS algorithms against seed jamming attacks," 2012 IEEE Global Communications Conference (Globecom), Anaheim, CA, 2012, pp. 801-806.

J. Yu, H. Li, Y, d. Yao and N. J. Vallestero, "LPI and BER Performance of a Chaotic CDMA System," IEEE Vehicular Technology Conference, Montreal, Que., 2006, pp. 1-5.

W. S. Yuan and C. N. Georghiades, "Rapid carrier acquisition from baud-rate samples," in IEEE Transactions on Communications, vol. 47, No. 4, pp. 631-641, Apr. 1999.

A. A. Zaher, "An improved chaotic shift keying technique," *2012 5th International Symposium on Communications, Control and Signal Processing*, Rome, 2012, pp. 1-4.

\* cited by examiner

Measured bit error rate versus SNR ($E_c/N_0$) for preliminary HOPS hardware testbed

HIGH-ORDER PSK SIGNALING (HOPS) TECHNIQUES FOR LOW-POWER SPREAD SPECTRUM COMMUNICATIONS

CROSS-REFERENCE TO RELATED APPLICATIONS

This application claims priority to and the benefit of U.S. Provisional Patent Application No. 62/553,039, entitled HIGH-ORDER PSK SIGNALING (HOPS) TECHNIQUES FOR LOW-POWER SPREAD SPECTRUM COMMUNICATIONS, filed Aug. 31, 2017, and U.S. Provisional Patent Application No. 62/553,035, entitled FALLTHROUGH CORRELATION TECHNIQUES FOR ARBITRARY-PHASE SPREAD SPECTRUM WAVEFORMS, filed Aug. 31, 2017, the disclosures of each of which are hereby incorporated by reference in their entirety for all purposes. This application is related to U.S. application Ser. No. 16/119,763, entitled HIGH-ORDER PSK SIGNALING (HOPS) TECHNIQUES FOR LOW-POWER SPREAD SPECTRUM COMMUNICATIONS, filed on even date herewith, and to U.S. application Ser. No. 16/119,734, entitled FALLTHROUGH CORRELATION TECHNIQUES FOR ARBITRARY-PHASE SPREAD SPECTRUM WAVEFORMS, filed on even date herewith, the disclosures of each of which are hereby incorporated by reference in their entirety for all purposes.

BACKGROUND

Of particular interest in adapting sequence-based spread spectrum signaling techniques to the needs of low-power commercial standards are the (1) recognition that most resulting systems will be co-user interference limited as opposed to noise limited (primary case for signals operating below the thermal noise floor and/or when successfully separated using multiple access methods), renewing the need to consider near-far power controls; (2) the number of nodes supported in a multiple access context will be significantly larger than in most military applications given the high density of wireless nodes in IoT deployments; (3) the resulting signals should conform better to existing commercial spectrum allocations, such as the open-use industrial, scientific, and medical (ISM) bands; (4) the resulting protocols support asynchronous operation since some nodes wake up intermittently, and (5) acceptance that maintaining security between nodes is a practical balance between implementation, computational complexity and the security features achieved, yet most commercial methods prevent peace of mind on factory floors or civil aviation platforms due to the compromises made. In addition, any computational methods that may be used to reduce the processing expense of signal acquisition and/or tracking are well worth considering, particularly in hierarchical networks where wired data concentrators have access to DC power and act as network gateways and battery-powered and/or intermittently powered edge nodes perform most of the data collection or commanded actions.

SUMMARY

The High-Order PSK Signaling (HOPS) communications system and techniques described herein may be used to adapt sequence-based spread spectrum signaling techniques to the needs of low-power commercial standards in a manner that enables large collections of nodes to operate at reasonable data rates (e.g., approximately 1 kbps of data) while reducing computational complexity and supporting a compact, fixed-point hardware implementation. The proposed HOPS techniques also offer a series of computational efficiency enhancements over previous chaos-based signaling techniques. These make their construction both distinct and better suited to implementation on micro-processor-level computing infrastructures, yet still render them capable of strong multi-user channel access and system agility that supports avoidance of externally injected interfering signals.

In one aspect, the disclosure relates to a signal receiver for receiving a HOPS-based communications signal. The signal receiver includes a seed calculator configured to produce a series of seed vectors generated from a corresponding series of sets of key values. A sequence generator provides a series of internally generated sequences using the series of seed vectors. A fallthrough correlator is configured to produce a series of correlation values by correlating samples of a received signal and samples of the internally generated sequences, the internally generated sequences corresponding to spreading sequences created using ones of the seed vectors. The spreading sequences are used by a transmitter to generate a transmit signal subsequently received by the signal receiver as the received signal. The signal receiver further includes a peak detector configured to generate a trigger signal upon determining that at least one of the correlation values exceeds a threshold value. The signal receiver also includes a plurality of demodulator chains wherein at least one of the plurality of demodulator chains is selected in response to the trigger signal and used to demodulate the received signal in order to recover data values carried by the received signal.

The seed calculator may be implemented as a residue calculator operative to calculate, in response to the series of sets of key values, a series of residue vectors corresponding to the series of seed vectors wherein each of the key values is defined with respect to a residue number system (RNS). Each of the residue vectors may include n index values wherein the RNS is based upon n prime values. The residue calculator may be further configured to generate each of the n index values for one of the residue vectors by separately reducing, modulo by a corresponding one of the n prime values, a sum of the key values within a corresponding one of the sets of key values.

In one implementation each of the sets of key values may include a time-based counter value respectively corresponding to one of a plurality of time epochs, the residue calculator being configured to generate one of the sets of key values during each of the plurality of time epochs.

The fallthrough correlator may further include a tapped delay line and a plurality of complex multipliers. The tapped delay line receives a set of the samples of the received signal wherein the tapped delay line includes a plurality of taps and wherein each of the plurality of taps is separated by one of a corresponding plurality of delay elements. Each of the plurality of complex multipliers is coupled to one of the plurality of taps and is configured to multiply at least one of the samples of the received signal by one of a plurality of matched filter coefficients. The plurality of matched filter coefficients may correspond to values of the samples of the internally generated sequence during one of a plurality of time epochs, wherein the internally generated sequence changes during each of the plurality of time epochs.

In one implementation, the fallthrough correlator may further include a summation module including a plurality of adders. Each of the adders may include a first input coupled to an output of one of the plurality of complex multipliers and a second input coupled to an output of one other of the plurality of adders. A last of the plurality of adders is configured to output a correlation signal wherein a peak value of the correlation signal exceeds a threshold value when a sufficient correlation exists between the set of the samples of the received signal and the values of the samples of the internally generated sequence.

The fallthrough correlator may be further configured to use a magnitude of the peak value to estimate a power level of the received signal and to operate using at least one of exclusively asynchronous digital logic and analog delay lines. Each of a plurality of complex mutlipliers within the fallthrough correlator may be implemented with a reduced precision relative to a precision of the samples of the received signal. In a particular implementation each the plurality of complex multipliers are implemented as a corresponding plurality of sign-selected adder trees.

In one embodiment of the signal receiver the sequence generator is configured to dynamically vary a length of the internally generated sequence based on the estimate of the power level of the received signal In applications in which the received signal includes a series of signal bursts, the center frequencies of which may vary pseudorandomly, the fallthrough correlator may be further configured to use the series of correlation values to determine at least one of frequency offsets and precision timing of ones of the signal bursts. When the transmitter is configured to transmit the transmit signal as a series of burst-mode communications messages, a center frequency of each successive one of the burst-mode communications messages may be selected.

The disclosure is also directed to a method for receiving a HOPS-based communications signal. The method includes calculating a series of seed vectors using a corresponding series of sets of key values. The method further includes generating a series of internally generated sequences using the series of seed vectors. Samples of a received signal and samples of the internally generated sequences are then correlated in order to produce a series of correlation values. The internally generated sequences corresponding to spreading sequences created using ones of the seed vectors wherein the spreading sequences are used by a transmitter to generate a transmit signal subsequently received as the received signal. The method also includes generating a trigger signal upon determining that at least one of the correlation values exceeds a threshold value. One of a plurality of demodulator chains may then be selected in response to the trigger signal. The received signal is then demodulated using the selected demodulator chain in order to recover data values carried by the received signal.

In one aspect the calculating stage includes calculating a series of residue vectors generated from a corresponding series of sets of key values. Each of the key values are defined with respect to a residue number system (RNS) wherein the series of residue vectors corresponding to the series of seed vectors. Each of the residue vectors may also include n index values, where the RNS is based upon n prime values. The method may also include generating each of the n index values for one of the residue vectors by separately reducing, modulo by a corresponding one of the n prime values, a sum of the key values within a corresponding one of the sets of key values.

In another aspect each of the sets of key values includes a time-based counter value respectively corresponding to one of a plurality of time epochs, the method further including generating one of the sets of key values during each of the plurality of time epochs.

In yet a further aspect the disclosed method the transmitter may be configured to transmit the transmit signal as a series of burst-mode communications messages where a center frequency of each successive one of the burst-mode communications messages is selected pseudorandomly.

BRIEF DESCRIPTION OF THE DRAWINGS

The present disclosure is more fully appreciated in connection with the following Detailed Description taken in conjunction with the accompanying drawings. The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
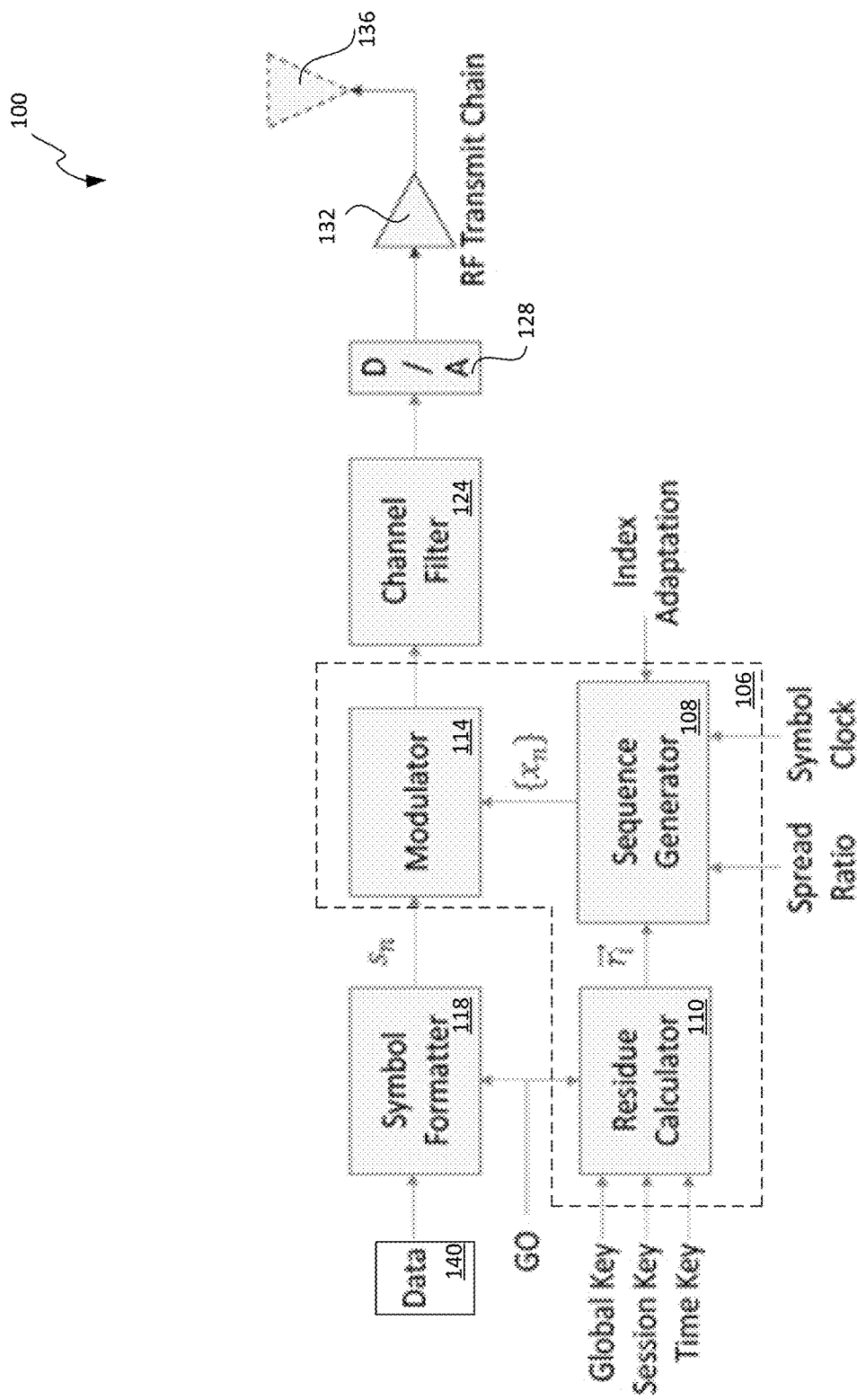
FIG. 1 provides a block diagrammatic illustration of an embodiment of an embodiment of a HOPS transmitter configured to produce a HOPS signal using low-power generation techniques.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

HOPS System Overview

Described herein are embodiments of a HOPS modulation system and technique capable of supporting short low-power bursts of communication signals that each convey small amounts of data. Such capabilities are useful in, for example, systems including multiple sensors which change infrequently, leading to low duty cycle bursts. The individual data payloads associated with such sensors also tend to be small, bounded in many cases by 256 bits apiece. The large number of nodes and low data rates in such sensor systems are conducive to a code division multiple access (CDMA) based channel sharing using sequence-based spread spectrum techniques. Rather than sticking to traditional binary/quadrature-phase DSSS waveforms, embodiments of the HOPS spread spectrum links take advantage of the spectral compactness and security benefits arising from arbitrary phase PSK signaling techniques. As a burst waveform construct, each HOPS signal may be viewed as a vector of metadata-driven burst parameters coupled with a variable-length data payload. Those parameters may be modified burst-to-burst, enabling dynamic properties like different destinations, performing code-hopping or frequency-hopping, or changing modulation characteristics. This burst structure also enables batch-style processing, whereby messages share a common transmission process and can be performed in real-time or (for non-latency critical applications) implemented in an offline style processing that minimizes total power.

Reception of the signal follows that of most sequence-based spread spectrum systems, modified to use a novel single-shot fallthrough correlator as the signal detector. Any number of independent demodulator chains may be incorporated, with each having independent DC bias/wake up controls, as a mechanism to scale multiple access performance.

The disclosure begins with an overview of the HOPS system model, focusing on the synthesis of techniques for sequence generation, modulation, and synchronization, while also highlighting aspects of exemplary hardware implementations. As is discussed below, the HOPS system model provides added controls for signal dynamics (code-hopping, time-hopping, and frequency-hopping) via use of a constantly cycling residue number system (RNS)-based sequence generator framework. The extensions of this HOPS system model towards optimizations for data aggregation within IoT-style hierarchical networks, minimizing end-to-end latency, and adaptive data rates are also discussed herein.

Attention is now directed to FIG. 1, which provides a block diagrammatic illustration of an embodiment of an embodiment of a HOPS transmitter 100 configured to produce a HOPS signal using low-power generation techniques. Embodiments of the transmitter 100 enable generation of HOPS signals having time-evolving signal dynamics via use of a constantly cycling residue number system (RNS)-based sequence generator. Although not shown in FIG. 1, the HOPS transmitter 100 may be utilized in systems and networks including multiple other HOPS transmitters and multiple HOPS receivers.

As shown in FIG. 1, the HOPS transmitter 100 includes a spread spectrum modulator 106 having a sequence generator 108 configured in response to residue vectors produced by a seed calculator, which in the embodiment of FIG. 1 is implemented as an RNS calculator 110. It may be appreciated that in other embodiments, the seed calculator and spread spectrum modulator may be realized using other pseudorandom number generators (PRNGs). The spread spectrum modulator 106 further includes a modulator element 114 operative to spread an encoded or non-encoded data signal received from a symbol formatter 118 with an optionally non-repeating spreading sequence produced by the sequence generator 108. During operation of the transmitter 100, the residue calculator 110 provides the sequence generator 108 a series of unique residue vectors calculated based upon a set of time-evolving values of a plurality of keys. In one embodiment, the plurality of keys include a global key, a session key and a time key or counter, which is incremented every system time epoch (e.g., every 1 second). This time evolution of the key values provided to the residue calculator 110 results in a different residue vector being calculated by the residue calculator 110 every time epoch and thus a different corresponding spreading sequence being generated by the sequence generator 108 each time epoch. The transmitter 100 also includes a channel filter 124 coupled to an output of the modulator element 114, a digital to analog (D/A) subsystem 128, an RF transmit subsystem 132, and an antenna 136.

Data source 140 may be implemented as an interface though which an externally-provided input signal is received. During operation of the transmitter 100, data source 140 may supply bits of data to the symbol formatter 118 at a specified data rate.

The symbol formatter 118 may conventionally encode the data provided by the data source 140 and format the encoded data into symbols. For example, the encoded data may be formatted into phase shift keyed (PSK) symbols (e.g., QPSK symbols). The symbol formatter 118 may also include conventional sample rate matching structures so that a sample rate of the PSK symbol data matches that of an arbitrary-phase spreading sequence generated by the sequence generator 108 in the manner described hereinafter. Likewise, the symbol formatter 118 may also include conventional pulse shape filtering structures so that inter-symbol interference is managed.

The modulator element 114 includes one or more complex multipliers operative to perform complex-valued digital multiplication operations using the formatted digital symbol data from the symbol formatter 118 and the non-repeating, arbitrary-phase spreading sequence provided by the sequence generator 108. The output of the complex multiplier yields a discrete-time discrete-amplitude baseband or intermediate frequency (IF) signal, which may be characterized as an arbitrary-phase PSK signal. Without limitation, the channel filter 124 may optionally be used to perform functions to interpolate the signal, reduce inter-chip interference, and/or resample the signal.

Within the D/A subsystem 128, the spread spectrum arbitrary-phase PSK signal may be conventionally interpolated, converted to analog form using a digital to analog converter (DAC), and upconverted in frequency to an RF signal. The RF transmit subsystem 132 may then amplify and transmit the RF signals as a spread spectrum communication signal using the antenna 136.

Figure 2:
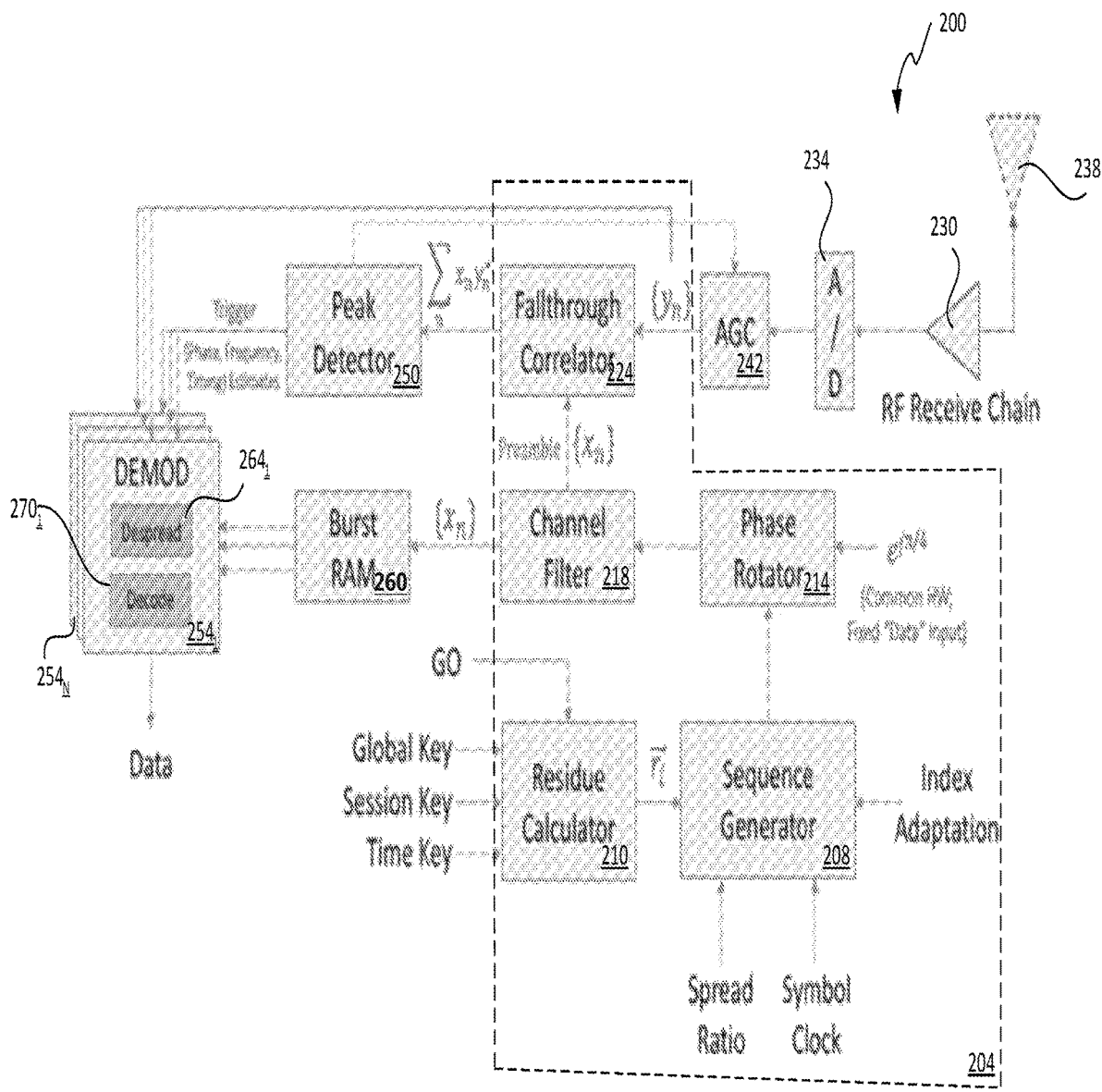
FIG. 2 provides a block diagrammatic illustration of an embodiment of an embodiment of a HOPS receiver.

Attention is now directed to FIG. 2, which provides a block diagrammatic illustration of an embodiment of an embodiment of a HOPS receiver 200. As shown, the receiver 200 includes a correlation apparatus 204 having a sequence generator 208 essentially identical to the sequence generator 108 within the transmitter 100. The correlation apparatus 204 further includes a seed calculator implemented as a residue calculator 210 substantially identical to the residue calculator 110 within the transmitter 100.

During operation of the receiver 100, the residue calculator 210 provides the sequence generator 208 a series of unique residue vectors calculated based upon a set of time-evolving values of the same keys (e.g., a global key, a session key and time key or counter) provided to the spread spectrum modulator 106 of the transmitter 100. Again, the time evolution of the key values provided to the residue calculator 210 results in a different residue vector being calculated by the residue calculator 210 each time epoch and thus a different corresponding spreading sequence being generated by the sequence generator 208 each time epoch. The spreading sequence, i.e., preamble, generated by the sequence generator 208 is rotated in phase by a phase rotator 214 and filtered by a channel filter 218 prior to being provided to a fallthrough correlator 224, which is described hereinafter and in the above-referenced copending application Ser. No. 16/119,734. While this embodiment shown in FIG. 2 employs the fallthrough correlator 224, note that traditional direct sequence spread spectrum processing techniques may be employed without limitation.

The receiver 200 also includes an RF receive chain 230 and an analog to digital (AID) converter unit 234. After being received by antenna 238 of receiver 200, the spread spectrum communication signal communicated from the transmitter 100 is provided to the RF receive chain 230 in which it may be conventionally amplified, downconverted in frequency to an IF. The IF signal from the receive chain 230 may then be filtered and converted to a digital signal using the A/D converter unit 234. An automatic gain control (AGC) circuit may adjust the gain of the received signal before passing to the fallthrough correlator 224.

During operation of the receiver 200, the fallthrough correlator 224 is configured to produce a series of correlation values by correlating samples of the received signal and samples of the preamble sequences internally generated by the sequence generator 208. In this way, the fallthrough correlator 224 is used to discriminate the presence of an incoming signal preamble (or other known signal content). A peak detector 250 operates to generate a trigger signal upon determining that at least one of the correlation values exceeds a threshold value, thereby determining the timing of the incoming signal preamble.

The trigger signal is used to select one of N demodulator chains 254 for demodulating simultaneously received images of the received signal (e.g., multipath) in order to recover data values carried thereby or to receive multiple independently transmitted signals from different transmitters. Reception of other multipath images and/or independently transmitted signals of one or more received signals results in generation of additional trigger signals and selection of other of the N demodulator chains 254. The preamble sequence stored within a burst RAM module 260 when a given trigger signal is generated corresponds to the sequence used by the fallthrough correlator to produce the correlation value giving rise to the trigger signal. Accordingly, the time-aligned preamble sequence within the burst RAM module 260 is used by a despreading module 264 of the selected demodulator chain 254 for despreading of the received signal. The despreading module 264 may include an accumulate & dump circuit or the equivalent that assists with translation from despread spread spectrum chips into data symbols. During steady state operation of the receiver 200, the output produced by the despreading module 264 corresponds to "soft decisions" of PSK symbols. These PSK soft decisions may be provided to a decoder module 270, which is configured to render final decisions with respect to each soft decision and thereby produce a recovered symbol stream. The recovered symbol stream may then be conventionally decoded into recovered data corresponding to an estimate of the input data provided by the data source 140. Although not shown, traditional mechanisms for data frame verification like cyclic redundancy checks (CRC) or forward error correction (FEC) processing may be inserted into the processing of the decoder module 270 to improve error rate performance.

Figure 3:
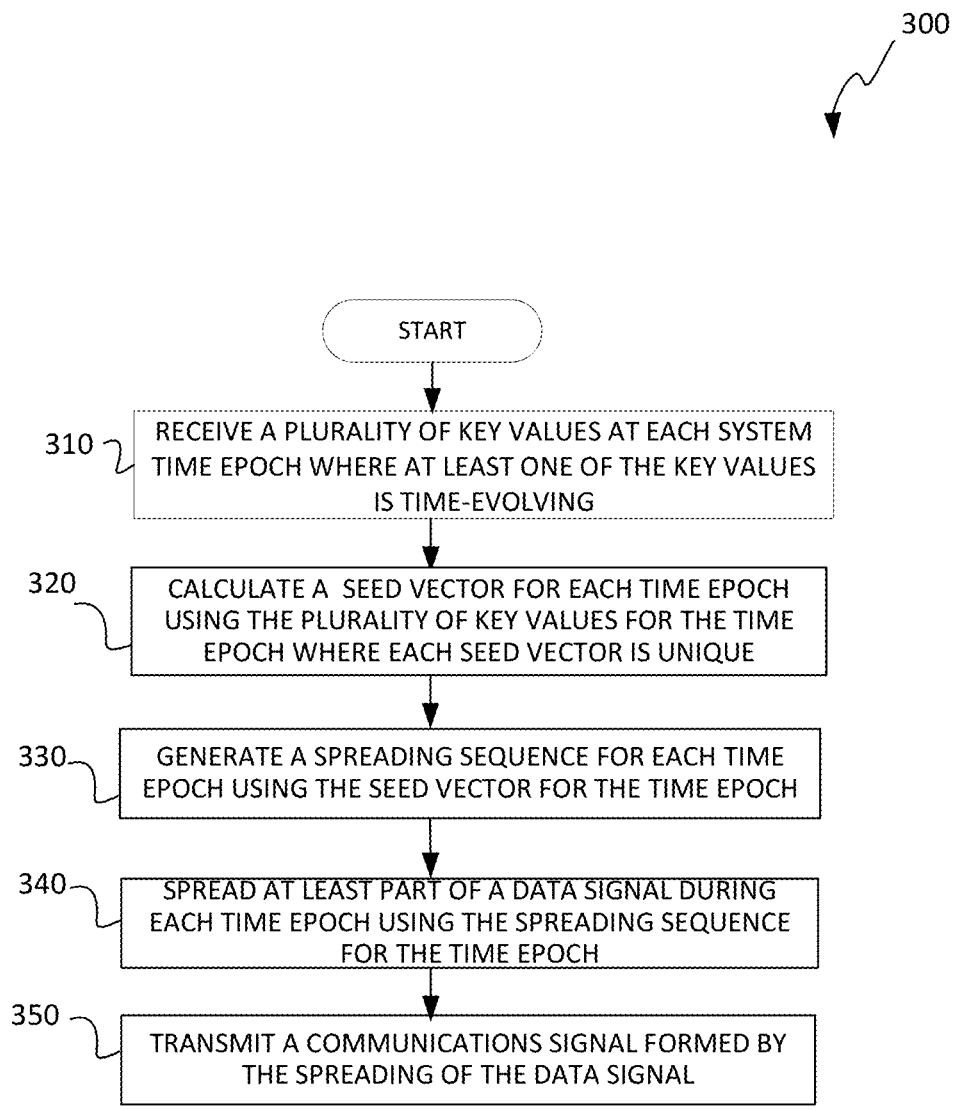
FIG. 3 is a flowchart illustrating an exemplary process for HOPS signal generation and transmission.

Turning now to FIG. 3, a flowchart is provided which illustrates an exemplary process 300 for HOPS signal generation and transmission. As shown, the process 300 includes receiving a plurality of key values at each system time epoch where at least one of the key values evolves over time (stage 310). A seed vector is calculated for each time epoch using the received key values, where each seed vector is unique (stage 320). A spreading sequence is generated for each time epoch using the seed vector for the time epoch (stage 330). The process 300 further includes spreading at least part of a data signal during each time epoch using the spreading sequence for the time epoch (stage 340). A communications signal formed by the spreading of the data signal may then be transmitted (stage 350).

Figure 4:
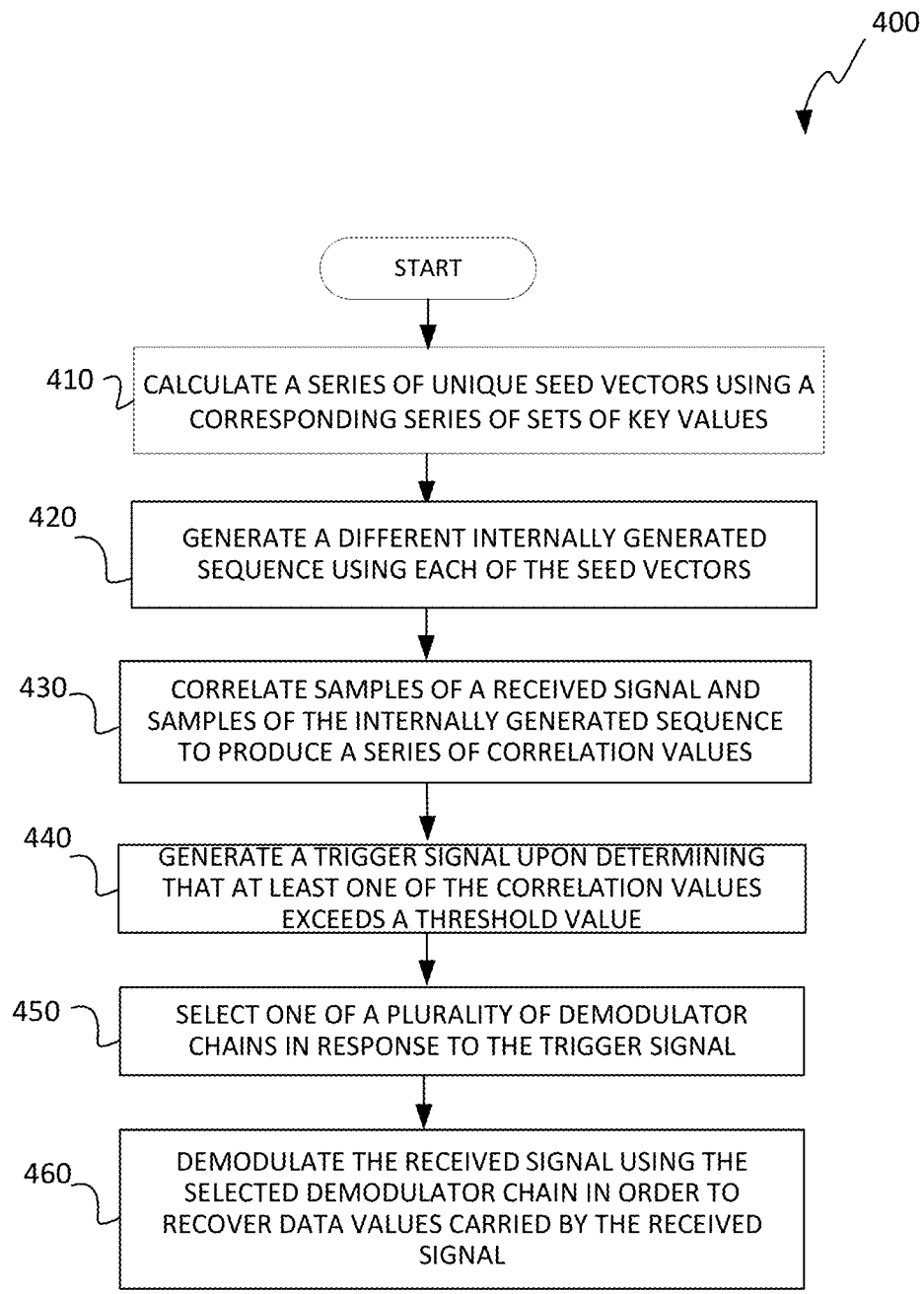
FIG. 4 is a flowchart illustrating an exemplary process for receiving, demodulating and decoding a HOPS signal in accordance with the disclosure.

FIG. 4 is a flowchart illustrating an exemplary process 400 for receiving, demodulating and decoding a HOPS signal in accordance with the disclosure. The process 400 includes calculating a series of unique seed vectors using a corresponding series of sets of key values (stage 410). In one embodiment the series of unique seed vectors are manifested as a series of residue vectors produced using a residue calculator in response to the sets of key values, each of which is included within an RNS. A different internally generated sequence is then generated using each successive seed vector (stage 420). Samples of a received signal and samples of the internally generated sequence are then correlated to produce a series of correlation values (stage 430). A trigger signal is generated upon determining that at least one of the correlation values exceeds a threshold value (stage 440). In response to the trigger signal, one of a plurality of demodulator chains is selected (stage 450). The selected demodulator chain then demodulates the received signal using the internally generated preamble sequence responsible for initiating generation of the trigger signal, thereby enabling recovery of data values carried by the received signal (stage 460).

Additional details relating to the overall HOPS system structure depicted in FIGS. 1 and 2 are provided in the following subsections. In particular, the following discussion focuses on embodiments of a burst-mode sequence generation engine utilized by the sequence generators 108, 208 and associated residue calculators 110, 210, the synchronization between transmitter 100 and receiver 200, network topology considerations, and multiple access scalability.

A. Sequence Generation Engine

At the core of embodiments of the HOPS baseband signal processing is an RNS-based sequence generation engine that supports real-time burst mode operation. Assuming an RNS consisting of n prime characteristic ($p_i$) residue spaces, with an overall dynamic range of $M=\Pi_{i=1}^{n} p_i$, the sequence generator accepts a vector of distinct residues, $\vec{r}_i$ at the beginning of the burst to define the initial conditions of that burst's sequence. Given the computationally efficient googol-year style sequences that may be generated, the key characteristic to non-repeatability is to ensure that the inserted indexes are not repeated or overlap. As configured, the residue vectors for each burst supports the addition of three distinct keys, each in RNS format (all values in the vector format satisfy $0 \leq r_i < p_i$), representative of a global key $\vec{r}_G$ (shared by all nodes in the network), a session key $\vec{r}_S$ shared by all nodes in the subnet), and a time-based counter $\vec{r}_T$ (constantly updating). These residue components are directly added together and reduce modulo the prime values to get the initial index values for that burst.

$$\text{Initial Residues} = \vec{r}_i (= \vec{r}_G + \vec{r}_S + \vec{r}_T) \bmod p_i \quad (1)$$

One alternate interpretation of these keys is that the session key represents the address of the intended recipient, whereby the total googol-length sequence may be subdivided into distinct user code spaces. It should be noted however that the selection of three distinct keys is arbitrary—any number of distinct keys ($\geq 1$) may be inserted in order to define the use of the maximal length code space. Moreover, the refresh period between updates of the key(s) (an individual time "epoch") is a configurable system design parameter for the network. As a practical compromise between security and complexity, in one embodiment the time epoch is taken to be on the order of 1 second, although employing a ping-pong structure between two fallthrough correlators (reasonable for DC-powered nodes) enables timing epochs on the order of 1 ms. Since the spreading code produced by the sequence generators 108, 208 rolls over at each time epoch, each preamble targeted at the beginning of new time epochs is also unique. The important characteristic is to choose those values in a way that keys may not repeat due to different assignments.

B. Synchronization

To avoid any significant computational expense arising from maintaining well synchronized clocks, the HOPS framework assumes relatively crude synchronization processes ($\pm 1$ ms). Configuring the HOPS signals to balance (1) a chaotic sequence spread spectrum (CSSS)-derived waveform's desire to never repeat and (2) a low-power node's desire to minimize signal acquisition processing leads to a constrained window of signal acquisition processing.

Reception of the HOPS signal is optimized to support RX-assigned CDMA processing with a fallthrough correlator, where the time-varying preamble signal is recorded each time epoch and used as matched filter coefficients. Current embodiments of the fallthrough correlator are implemented traditionally as a time-varying digital finite impulse response (FIR) filter, leading to a large number of pipelined additions that trigger when a signal preamble present within the received signal falls through the correlator. Much like DSSS correlators, this process may be implemented using a quadrature-phase approximation of the internally generated chipping sequence, $$\text{Peak} = \sum_n x_n y'_n \approx \sum_n x_n \text{sign}(y_n)' \qquad (2)$$

with approximately 1.05 dB ( $$\frac{2\sqrt{2}}{\pi}$$

energy multiplier) of phase mismatch loss, which is acceptable given the hardware minimized. The second benefit of this approach is that fine timing for the burst is completely achieved via the triggering of the pulse. Moreover, timing of multipath images and multi-user signal reception may be performed with that single shared correlator, with each trigger initiating a distinct demodulator chain. Likewise, the tapped delay lines, which are the most computationally expensive portion of the design, may also be partially reused if simultaneously searching for two different preambles (e.g., a multicast address and a unicast address) since the receive signal is common between them. The final benefit of the fallthrough correlator approach is that received signal frequency offsets may be sufficiently approximately using a decimated set of phase-rotated intermediate results from the overall correlator adder tree. The size of the correlator is driven by the duration of the preamble times the spreading ratio of the waveform, optionally reduced by resource folding in an FPGA or other logical folding.

Future versions of the fallthrough correlator have been modeled to incorporate lower power asynchronous logic (with orders of magnitude improvements in DC power draw) and to make improvements in the adder tree on a burst-by-burst basis, where small coefficients are simply dropped from calculation, enabling a sparser correlation on a subset of coefficients.

C. Network Topologies

Figures 5A, 5B:
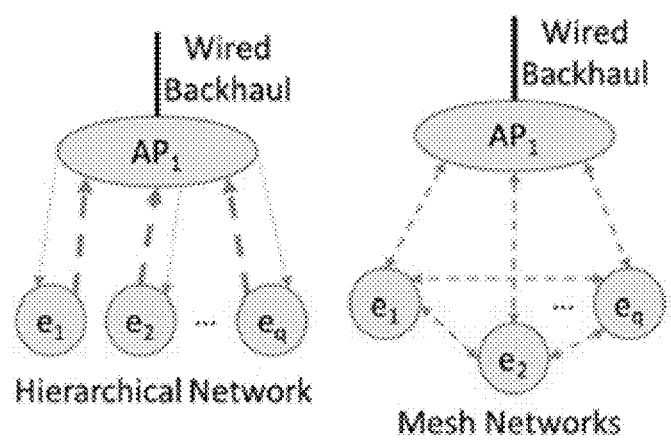
FIGS. 5A and 5B illustrate comparative network hierarchies for a HOPS communication network implemented in a low-power IoT environment.

For reduced power distributed networks most relevant to IoT applications, the majority of these architectures possess a large number of edge nodes that each support a unique, yet narrowly constrained function (e.g., periodic reporting of a pressure, temperature, or subsystem health state). Two different network topologies dominate IoT systems: hierarchical and/or mesh networks. For extremely low power operation, a hierarchical network enables addressing between the power constrained node and one unique access point (with defined backups for redundancy as needed). Examples of such networks include some localized industrial IoT applications, and tire pressure monitoring systems (TPMS). Mesh networked devices and/or specific cases where peer-to-peer communications is required as part of a relay node offer additional flexibility in the usage of the system, yet also require more power and processing to support that network flexibility. Examples of such systems include spatially dispersed IoT applications and devices using the Zigbee and Bluetooth standards. Hybrid applications (e.g., wireless aviation intra communications (WAIC)) may require support from both methodologies as a result of the much higher security requirements, again accepting slight increases in computational complexity. The goal of the HOPS waveform construct is to support any combination of these methods, although most links are anticipated to be asymmetric, with data primarily flowing upwards through the network from edge nodes ($e_i$) to data concentrators/access points (AP). A conceptual depiction of these networked data flows is shown in FIGS. 5A and 5B.

An important characteristic for these networks, in particular due to the intermittent nature of power available to some of the nodes, is the initial network formation. Using a strict hierarchical network simplifies this process, since an edge node only needs to look for the invitation from its pre-defined master (or alternate master) access point. Low-complexity node-specific or subnet-wide synchronization pulses may be used to obtain the initial network timing/current time epoch, subsequently translated into matched filter coefficients that remain active for that time epoch. Responses to a detected invitation may then be an immediate canned response or (preferably) require a staged handshake based on previously shared private key information. The simplest such challenge/response model is to re-use the sequence generator to produce sequences of time-adjusted bursts—e.g., using a shared private key (combined with a coded timing pulse) to first produce a sequence of initial residues (not transmitted) that are then used to seed the sequence generator for a collection of bursts, with the edge node and access point taking turns, will provide reasonably high assurance that of all nodes' identities.

D. Multiple Access Scalability

Figure 6:
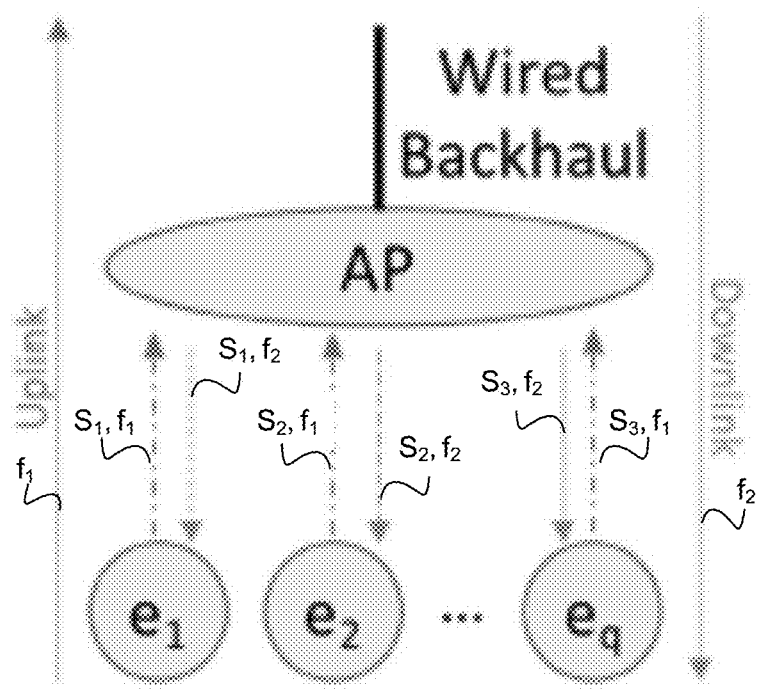
FIG. 6 illustrates a notional half duplex hierarchical network data flow model employing different frequencies ($f_1$, $f_2$) and spreading codes ($S_1$, $S_2$, $S_3$).

The final goal of the HOPS model is to support low-cost scalability of the deployed networks. In many networked military scenarios, the computational complexity and network overhead associated with managing dynamic link connections, storing and forwarding packets, or in requesting and allocating timeslots leads to practical, and sometimes surprisingly small, bounds on the network scalability. The intent for low-power IoT-style devices is to be able to support thousand(s) of nodes, achieved with a combination of cellular-based frequency planning and CDMA protocols. The use of the HOPS receiver-assigned CDMA enables localized control of individual subnets of wireless edge nodes, each employing an orthogonal spreading code. The use of multiple frequency channels within a single subnet point is also allowable, subdividing edge nodes in physical proximity into frequency division multiple access (FDMA)-specific subnets and supporting half duplex simultaneous communications between the edge nodes and the access point. From the vantage point of the access point, half duplex communications also enables simultaneous transmission of messages to different edge nodes, transmitting an ensemble of [time-/frequency-] overlapping signals, such that each edge node can use their targeted code to separate the message intended for themselves. Practical limitations may exist for sending multiple messages from the access point to the same edge node simultaneously though due to the RAKE receiver hardware allocations made within the low-powered node. A notional half duplex hierarchical network data flow model is shown in FIG. 6. As shown, the exemplary hierarchical network of FIG. 6 employs different uplink and downlink frequencies ($f_1$, $f_2$) and different spreading codes ($S_1$, $S_2$, $S_3$) for each node. Additional link security, adaptive spreading rates, as well as time-hopped, code-hopped, and frequency-hopped variants of the HOPS signals may be instituted on an epoch-by-epoch basis simply.

One of the benefits of the network scalability in this proposed context is that virtually all of the links are interference limited as opposed to noise limited. For the uplink from edge nodes to the access point, power control methods will need to be observed, with the access point being the primary observer of collisions and the most capable of performing the processing/computational expense of assigning power levels or transmission constraints. For the downlink, the interference limited nature of the signal ensemble, and its resulting signal-to-interference-plus-noise (SINR) at each edge node may be predicted ahead of time within the access point, making background noise the primary environmental observable to be measured by the low power nodes.

HOPS Optimizations

To describe a few specific use cases for the HOPS signal framework, the following subsections provide (1) concrete adaptations for data aggregation in IoT-style sensor networks, (2) methods to ensure sub-ms level latency in the PHY/MAC protocols, and (3) adapt data rates dynamically to support periodic bursts of sensor data. In general, the more of these capabilities that are added on top of the core PHY-layer HOPS construct, the higher the total computational power required.

A. IoT-Style Sensor Networks

The most common use case for the distributed low-power sensor networks is believed to be the asymmetrical hierarchical network of FIG. 6. The asymmetry of data transfer rates, most of which are assumed to be on the order of 10 kbps or less, heavily represent data flow from the edge nodes $\{e_i\}_{i=1}^{q}$ to the aggregating access point. Each edge node is assumed to possess a single transmitter and a single receiver (possibly with multipath support, but not completely independent demodulators), while the access point has an array of data modulators and RAKE receiver fingers (a single fallthrough correlator with multiple independent demodulators). By using a spreading ratio on the order of 50-500, the size of the network may be dynamically varied, bounded primarily by near-far power control. Given most of the edge nodes in a sensor network are physically static, power control will not be fast varying.

B. Minimum Latency Networks

A second use case for the sensor network depicted in FIG. 6 is minimum-latency time-sensitive networks, where a sensor value must be capable of being transmitted to other points in the broader network within a finite timeline. This reduced latency model has been validated both through fixed-point Simulink models and hardware validation, achieving MAC-to-MAC latencies on the order of 360 µs. These low latencies are possible only through the enabled asynchronous operation via CDMA channel sharing since edge nodes do not need to wait for any timeslot intervals prior to transmitting. A practical limitation to this model is that the access point must be configured to listen for the proper preamble associated with a specific time epoch, creating a need to maintain coarse real-time clock synchronization between all nodes. For low duty cycle sensors (e.g., nodes transmitting 100 bit messages 10 times per second), time epoch scales as low as 1 ms are reasonable, yet may be simplified to 1 s-scale intervals to reduce computation further if message spoofing is not a major concern.

C. Adaptive Data Rates

Another use case is the throttling of data rates among edge nodes within the sensor network containing HOPS transmitters. One scenario is a sensor that only transmits periodically, consisting of non-latency critical information. Four mechanisms that may be used to throttle the data rates are (1) varying spread ratios down and associated power levels up, (2) increasing modulation efficiency of the spread symbol, (3) pausing sensor traffic from other nodes, and (4) rescheduling the burst traffic to unallocated spectrum/channel capacity using demand assigned multiple access (DAMA) techniques. The final DAMA option also enables seamless integration of the HOPS spread spectrum network functions as a control channel for any arbitrarily selected non-spread modulations.

Hardware Implementation

A. Hardware Implementation Optimizations

The largest diversions of the HOPS protocol described herein from common DSSS-based protocols include higher spreading ratios, on the order of 50-500 in lieu of Zigbee's effective 15/2 spreading ratio, and the use of an asynchronous fallthrough correlator instead of a complex two-dimensional search process employed with other arbitrary phase spread waveforms. The multi-bit resolution sequence generator is computationally efficient and scalable, much like other RNS-based arithmetic, with scalability down to k=8-bit output words supported on a microprocessor-level processing engine. Nevertheless, this engine is more complex than a comparable linear feedback shift register (LFSR)-based sequence generator commonly used in DSSS. The real-time adaptation of the spreading code, the spectral compactness of the increased number of PSK phases, and the increased security is well worth the added computation in most IoT cases. The most computationally complex component is the fallthrough correlator, which is fully pipelined to support one correlation output value per clock cycle, and has an identified progression to low-power implementation in asynchronous logic.

To validate the hardware requirements for the HOPS model, a fixed-point solution was coded in Verilog and ported to an Altera Cyclone V SX SoC FPGA (5CSXFC6D6F31C6N). The sequence generators each required 12 KB of memory, equivalent to roughly 1.74% of the device's memory. The fallthrough correlator of size 1400 taps (spreading ratio 175 and preamble length 8), requires an estimated 44% of the device's ALMs if operated at the pipelined 20 MHz rate, although 10× folding projections reduce this figure closer to 5% of the device at 200 MHz. With minor optimizations, the overall HOPS transceiver hardware prototype requires ~16% of the ALM logic, 5.2% of the available memory bits, and 21% of the DSP blocks; the interface code, inclusive of the baseband radio interface to an ADI9361 mezzanine module and the SoC programming interface, adds approximately an additional 10% logic/ALM utilization.

Computational resources and simplifications for the HOPS system architecture shown in FIGS. 1 and 2 include:

Seed Calculation: the merging of the residue-based keys represent a vectorized addition of values guaranteed not to exceed 3 ($p_i$−1), which may be reduced modulo pr with pre-defined combinational logic.

Sequence Dynamics: the index adaptation parameters may be used to efficiently create custom time-varying adaptations to the code trajectory Channel Filter may be of significantly reduced order from signals attempting military security, yet still retain spectral compactness inherent to arbitrary phase waveforms. Moreover, by using a reduced 1-3 bit resolution correlation sequence in the fallthrough correlator, a significantly reduced precision may be propagated backwards into the receiver's "matched" channel filter without impacting performance.

Hardware Reuse: the entire sequence generation, modulator, and channel filter hardware may be reused between TX and RX side if transmitting is paused during preamble calculation at the beginning of each time epoch.

Fallthrough Correlator frequency offset calculation may use partial integrations of the overall matched filter correlation—such a process discretizes the frequency error estimate, yet simplifies computation significantly.

Burst RAM: this RAM must be of equal depth to the maximum data payload in number of chips times the oversampling rate; it is overwritten each time epoch. As prototyped, this required 1.7% of the available memory, scalable to ~13.9% for a spreading ratio of 500 and a preamble length of 16 symbols.

These hardware implementation optimizations offer the potential for an extremely low power implementation relative to the security level of the resulting burst-mode signal. Incorporating additional signal dynamics offer an even greater observed signal complexity with little additional hardware.

B. Hardware Validation

Figure 7:
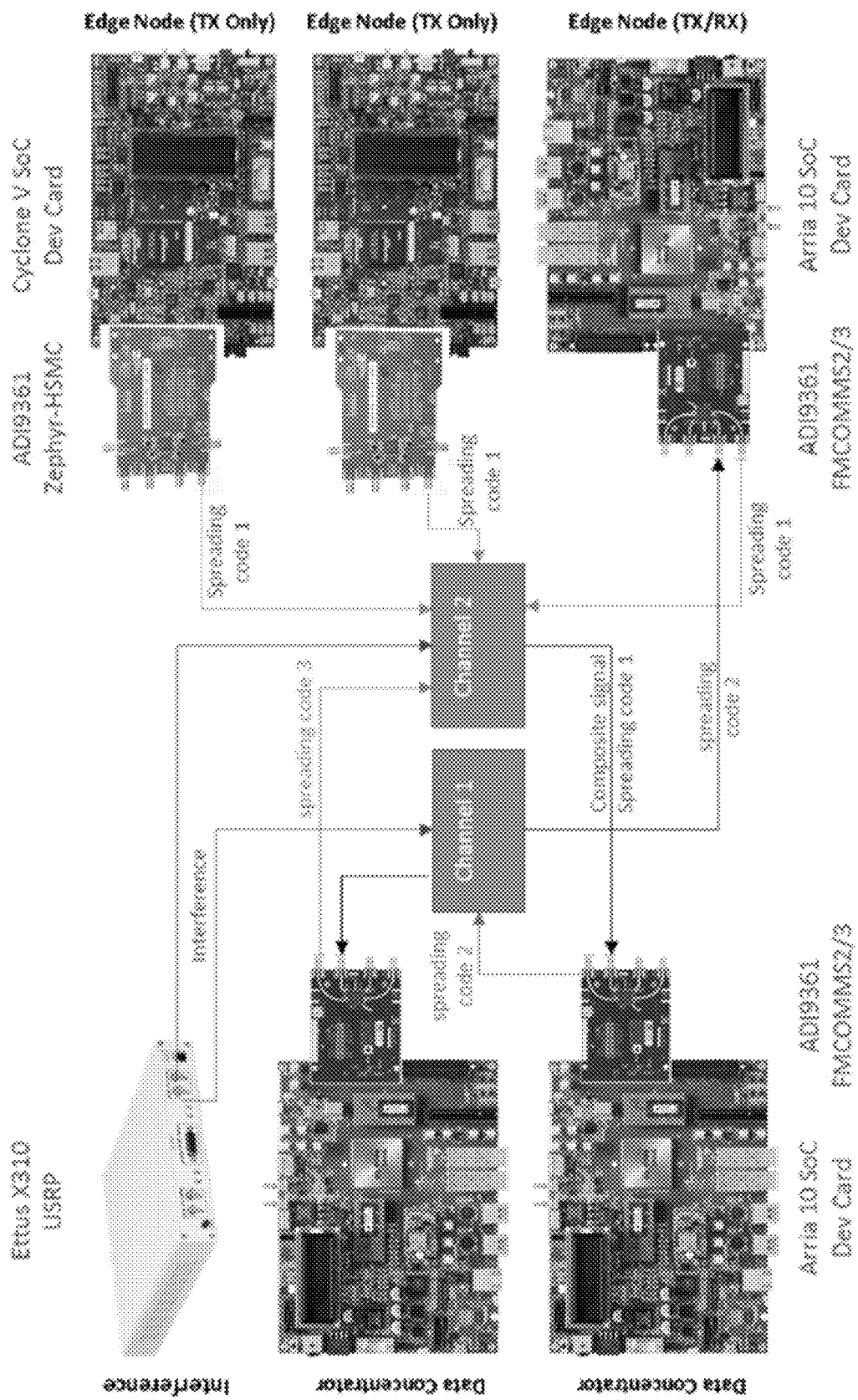
FIG. 7 illustrates a split frequency full duplex IoT hardware testbed used in verifying the suitability of the proposed HOPS models in realistic operational environments.

Attention is now directed to FIG. 7, which illustrates a split frequency full duplex IoT hardware testbed used in verifying the suitability of the proposed HOPS models in realistic operational environments. In particular, the hardware testbed of FIG. 7 was used for performance characterization of both calibrated wired and over-the-air transmissions. A variant of the HOPS waveforms were implemented on both Cyclone V SX SoC FPGAs and Arria 10 SoC FPGAs. An additional interference environment was established using an Ettus USRP software defined radio along with the AWGN noise output of a Keysight N5182B signal generator (not shown).

Streams of short message packets (on the order of 1-10 bytes) were transmitted using a customized data protocol, achieving robust multiple access performance with aggregate network throughput exceeding 100 kbps using shared 10 MHz channels. Clearly, such a throughput is relatively low when compared to many modern data protocols, yet the HOPS waveform and associated hardware testbed were designed at least in part for supporting extremely robust communications from large numbers of nodes, avoiding many of the cascaded collision effects from carrier-sense multiple access (CSMA)-based protocols.

Figure 8:
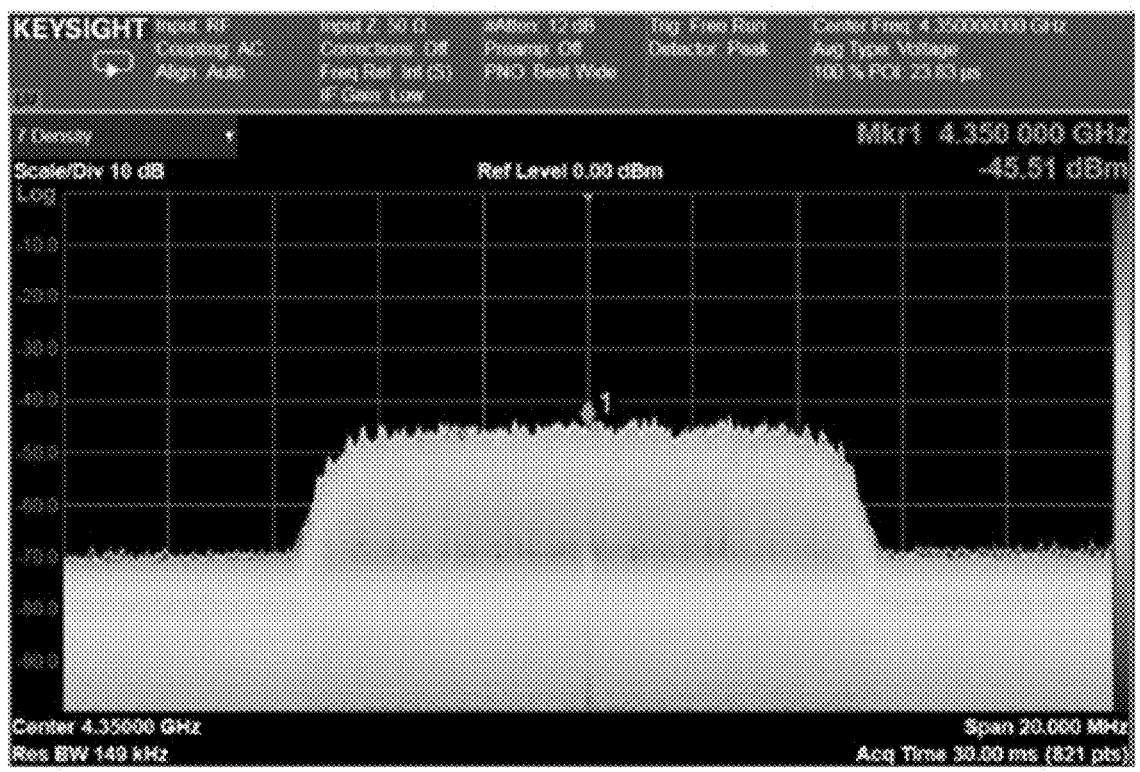
FIG. 8 provides a representative real-time spectrum analyzer capture of a repeated 10 MHz wide HOPS burst.

Additional validations of the HOPS hardware testbed were performed to evaluated the frequency domain representation of the signal. It should be noted that the time evolution of the underlying spreading sequence enables a randomization of the overall frequency response, yet a representative real-time spectrum analyzer capture of a repeated 10 MHz wide HOPS burst is shown in FIG. 8. Note that in FIG. 8 the HOPS signal has been intentionally raised above the noise floor to visualize the relative whiteness of the spectral response and the sharp rolloff of the bandlimited response. Also note that the visible DC spike is due to the direct conversion ADI 9361 transceiver, not the HOPS waveform itself.

Figure 9:
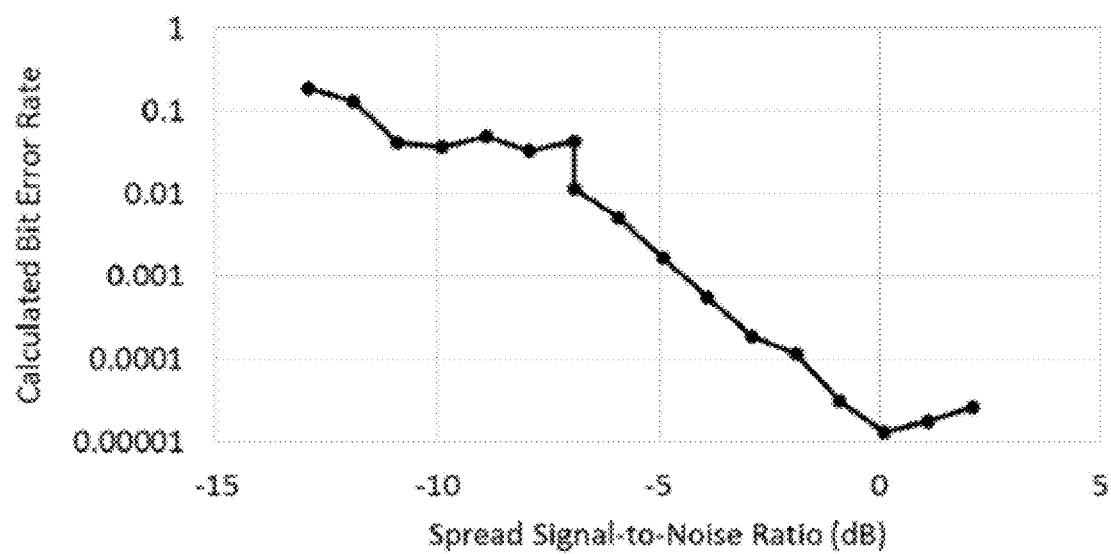
FIG. 9 is a plot of measured bit error rate versus SNR for a HOPS waveform transmitted within the HOPS hardware testbed of FIG. 7.

Finally, the HOPS hardware testbed of FIG. 7 was used to collect bit error rate measurements, extrapolated from raw frame error rates (forward error correction disabled). An initial BER performance curve is shown in FIG. 9, indicative of roughly 7 dB deviation from theory (measured against an underlying QPSK data modulation) versus the anticipated 3 dB deviation expected due to computational precision reductions. Refinement of the hardware testbed and tracking loops (with an adaptive fallthrough correlator threshold) is expected to achieve an objective implementation loss of 1-2 dB.

Selected Advantages of the HOPS System

The HOPS communication system described herein utilizes less computationally complex methods than are conventionally employed to increase security performance in low cost/low power IoT networks via a custom PHY-layer protocol. This protocol has extremely strong authentication properties and offers improved security relative to non-secure commercial protocols such as Bluetooth or Zigbee, even when these have been modified to incorporate minor ruggedizations. The disclosed HOPS communication system has been validated not only through fixed-point Simulink implementation of a complete burst-mode transceiver, but also through translation into live FPGA implementations and a hardware testbed undergoing successive improvements.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded into one or more different computers or other processors to implement various aspects of the present disclosure as discussed above.

The terms "program" or "software" or "code" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A signal receiver, comprising:
   a seed calculator configured to produce a series of seed vectors generated from a corresponding series of sets of key values;
   a sequence generator for providing a series of internally generated sequences using the series of seed vectors;
   a fallthrough correlator configured to produce a series of correlation values by correlating samples of a received signal and samples of the internally generated sequences, the internally generated sequences corresponding to spreading sequences created using ones of the seed vectors wherein the spreading sequences are used by a transmitter to generate a transmit signal subsequently received by the signal receiver as the received signal;
   a peak detector configured to generate a trigger signal upon determining that at least one of the correlation values exceeds a threshold value; and
   a plurality of demodulator chains wherein at least one of the plurality of demodulator chains is selected in response to the trigger signal and used to demodulate the received signal in order to recover data values carried by the received signal.

2. The signal receiver of claim 1 wherein the seed calculator is implemented as a residue calculator configured to calculate, in response to the series of sets of key values, a series of residue vectors corresponding to the series of seed vectors wherein each of the key values is defined with respect to a residue number system (RNS).

3. The signal receiver of claim 2 wherein each of the residue vectors includes an integer number of index values and wherein the RNS is based upon an integer number of prime values, and wherein the integer number is larger than 1.

4. The signal receiver of claim 3 wherein the residue calculator is further configured to generate each of the integer number of index values for one of the residue vectors by separately reducing, modulo by a corresponding one of the integer number of prime values, a sum of the key values within a corresponding one of the sets of key values.

5. The signal receiver of claim 2 wherein each of the sets of key values includes a time-based counter value respectively corresponding to one of a plurality of time epochs, the residue calculator being configured to generate one of the sets of key values during each of the plurality of time epochs.

6. The signal receiver of claim 2 wherein the fallthrough correlator is further configured to use a magnitude of a peak value to estimate a power level of the received signal.

7. The signal receiver of claim 6 wherein the sequence generator is configured to dynamically vary a length of the internally generated sequences based on the estimate of the power level of the received signal.

8. The signal receiver of claim 2 wherein the received signal includes a series of signal bursts and wherein the fallthrough correlator is further configured to use a series of correlation values to determine at least one of frequency offsets and precision timing of ones of the signal bursts.

9. The signal receiver of claim 1 wherein the fallthrough correlator includes a plurality of complex multipliers, each of the plurality of complex multipliers being implemented with a reduced precision relative to a precision of the samples of the received signal.

10. The signal receiver of claim 9 wherein each the plurality of complex multipliers is implemented including one or more sign-selected adder trees.

11. The signal receiver of claim 1 wherein the transmitter is configured to transmit the transmit signal as a series of burst-mode communications messages and wherein a center frequency of each successive one of the burst-mode communications messages is selected pseudorandomly.

12. A method of signal reception, the method comprising:
    calculating a series of seed vectors using a corresponding series of sets of key values;
    generating a series of internally generated sequences using the series of seed vectors;
    correlating samples of a received signal and samples of the internally generated sequences in order to produce a series of correlation values, the internally generated sequences corresponding to spreading sequences created using ones of the seed vectors wherein the spreading sequences are used by a transmitter to generate a transmit signal subsequently received as the received signal;
    generating a trigger signal upon determining that at least one of the correlation values exceeds a threshold value;
    selecting one of a plurality of demodulator chains in response to the trigger signal; and
    demodulating the received signal using the one of the plurality of demodulator chains in order to recover data values carried by the received signal.

13. The method of claim 12 wherein the calculating includes calculating a series of residue vectors generated from the corresponding series of sets of key values wherein each of the key values is defined with respect to a residue number system (RNS) and wherein the series of residue vectors corresponds to the series of seed vectors.

14. The method of claim 13 wherein each of the residue vectors includes an integer number of index values and wherein the RNS is based upon an integer number of prime values, wherein the integer number is larger than 1.

15. The method of claim 14 further including generating each of the integer number of index values for one of the residue vectors by separately reducing, modulo by a corresponding one of the integer number of prime values, a sum of the key values within the corresponding one of the sets of key values.

16. The method of claim 13 wherein each of the sets of key values includes a time-based counter value respectively corresponding to one of a plurality of time epochs, the method further including generating ones of the sets of key values during each of the plurality of time epochs.

17. The method of claim 12 wherein the transmitter is configured to transmit the transmit signal as a series of burst-mode communications messages and wherein a center frequency of each successive one of the burst-mode communications messages is selected pseudorandomly.

* * * * *